(12) United States Patent
Lannan

(10) Patent No.: US 6,340,072 B1
(45) Date of Patent: Jan. 22, 2002

(54) GREASE DAM FOR FILLING A WHEEL HUB CAVITY WITH GREASE AND METHOD OF USING SAME

(75) Inventor: Stephen Mark Lannan, Camden, SC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/471,158

(22) Filed: Dec. 23, 1999

(51) Int. Cl.$^7$ ................................................ F16C 1/24
(52) U.S. Cl. ...................................................... 184/5.1
(58) Field of Search ............................... 184/5.1, 105.1; 301/108.1; 384/474

(56) References Cited

U.S. PATENT DOCUMENTS

| | | |
|---|---|---|
| 1,149,660 A | 8/1915 | Ludlow |
| 1,337,558 A * | 4/1920 | King ........................ 184/105.1 |
| 1,660,728 A | 2/1928 | Stokes |
| 2,514,799 A | 7/1950 | Rubertino et al. |
| 3,949,837 A | 4/1976 | Tremblay ................. 184/105.1 |
| 4,027,929 A * | 6/1977 | Huddleston ................. 184/5.1 |
| 4,636,007 A * | 1/1987 | Persons ....................... 384/474 |
| 4,932,499 A | 6/1990 | Covert et al. ................ 184/5.1 |
| 5,080,198 A | 1/1992 | Rice ........................ 184/105.3 |
| 5,109,955 A | 5/1992 | Clark ....................... 184/105.2 |
| RE34,391 E | 9/1993 | Blake ......................... 184/5.1 |
| 5,303,800 A | 4/1994 | Persson ...................... 184/5.1 |
| 5,560,619 A | 10/1996 | Acree .......................... 277/23 |
| 5,584,359 A | 12/1996 | Reinersman ................ 184/5.1 |
| 5,658,053 A | 8/1997 | Vencill et al. ........... 184/105.1 |

* cited by examiner

Primary Examiner—Thomas R. Hannon
Assistant Examiner—Chong H. Kim
(74) Attorney, Agent, or Firm—Liniak, Berenato, Longacre & White

(57) ABSTRACT

A removable grease dam tool to facilitate proper filling of grease within a wheel hub assembly and a method of using the same. A grease dam is placed adjacent an outer surface of a wheel hub mounted to a spindle. The grease dam blocks at least 50% of the exposed area between the wheel hub and spindle and leaves a top portion open to allow greased to be injected into the inner cavity of the wheel hub. A portion of the grease dam is disposed within the wheel hub between the wheel hub and spindle to simulate the presence of the outer bearing. Once the inner cavity of the wheel hub is filled beyond a 50% fill level, the grease dam is removed and the outer bearing assembly is immediately thereafter installed. The tool prevents leakage of grease during assembly to ensure at least a 50% fill level. A handle is provided to facilitate manipulation by a user.

10 Claims, 3 Drawing Sheets

GREASE DAM FOR FILLING A WHEEL HUB CAVITY WITH GREASE AND METHOD OF USING SAME

FIELD OF THE INVENTION

The present invention relates to a tool for greasing wheel bearings and more particularly to a grease dam for ensuring proper fill of grease within the hub cavity prior to installing the outer bearing.

DESCRIPTION OF THE PRIOR ART

Greasing a wheel hub assembly is well known in the art. Heretofore, it has been the practice to first pack the inner bearing with grease and position the inner bearing within the hub and mount the hub and inner bearing upon the spindle. Grease is spread by hand uniformly about the grease cavity within the hub which is manually positioned in alignment on the spindle to receive the grease uniformly prior to mounting the outer bearing. Once grease is installed within the grease cavity the outer bearings are installed and secured to the spindle. The nut assembly and hub cap are then secured. However, because [of] the consistency of the grease is much like molasses, it is impossible to fill the hub cavity more than 30%, as much of the grease will simply leak out of the end of the hub assembly prior to installing the outer bearing and hub cap. Such insufficient filling of grease within the hub cavity results in premature bearing failure due to a lack of lubrication. Current standards call for filling the hub cavity with grease to at least 50% of the cavity volume. The present invention provides a simple tool for proper filling of grease during assembly of the wheel hub/spindle assembly without the need for complicated wheel end arrangements or greasing tool devices.

SUMMARY OF THE INVENTION

It is an object of the invention to provide a tool for properly filling a wheel hub cavity with grease as well as a method for its use that is superior to the prior art.

The present invention is directed to a removable grease dam tool to facilitate proper filling of grease within a wheel hub assembly. A grease dam is placed adjacent an outer surface of a wheel hub that is rotatably mounted to a spindle. The grease dam blocks at least 50% of the exposed area between the wheel hub and spindle and leaves a top portion open to allow grease to be injected into the inner cavity of the wheel hub. A portion of the grease dam is disposed within the wheel hub between the heel hub and spindle to simulate the presence of the outer bearing assembly. Once the inner cavity of the wheel hub is filled with grease beyond a 50% fill level, the grease dam is removed and the outer bearing assembly is immediately thereafter installed. The tool prevents leakage of grease during assembly to ensure at least a 50% fill level. A handle is provided to facilitate manipulation by a user.

DETAILED DESCRIPTION OF THE PREFERRED EMBODIMENT

Figure 1:
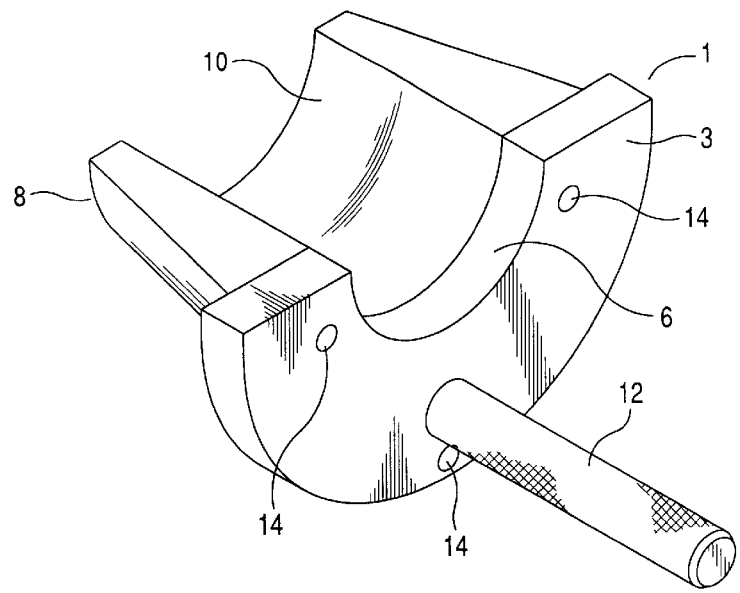
FIG. 1 is a perspective view of the grease dam tool according to the present invention.

FIG. 1 depicts a perspective view of the grease dam tool 1 of the present invention to ensure proper grease fill of a wheel hub assembly. The tool 1 is rather simple in construction and its use in the wheel hub assembly ensures at least a 50% grease fill of the wheel hub inner cavity. The grease dam tool 1 has three primary parts. A main portion 3 is formed of a semi-disc shaped substantially planar member having a central semi-circular notch 6 to accommodate and engage a spindle. The main portion 3 does not completely circumscribe the central notch 6 but preferably circumscribes the central notch 6 more than 180°. Such an arrangement provides the ability to fill the inner cavity more the 50%. A dam portion 8 extends from the main portion and is shaped to engage the inner surface of a wheel hub and an outer peripheral surface of a spindle. Preferably the dam portion is semi-frustoconically shaped and extends orthogonally from the main portion 6. The dam portion 8 has a recess 10 to accommodate and engage a wheel spindle. The semi-frustoconical shape of the dam portion 8 and the recess 10 allow the dam portion to be positioned between the wheel hub and the spindle thereby blocking egress of grease as will be later discussed in more detail. A handle 12 is provided to allow the tool to be manipulated by a user. The handle 12 simply extends from the main portion from an opposite side from which the dam portion 8 is provided.

Figure 2:
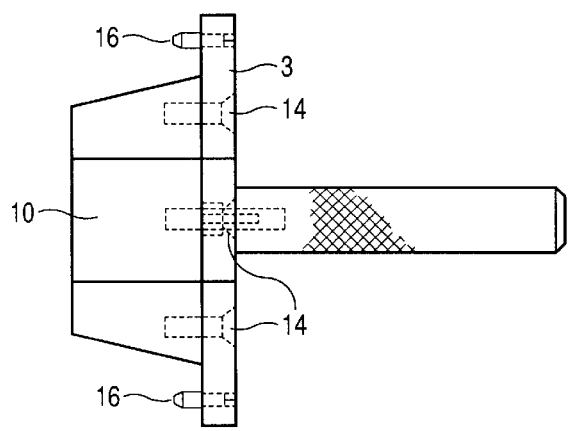
FIG. 2 is a top plan view of the grease dam tool of FIG. 1.

As can be seen from FIG. 2, the main portion 6, and the dam portion 8 are secured together by screws 14 which extend through the main portion 6 and engage the dam portion 8 to form an integral body. Other means to secure the main portion 6 and dam portion 8 may be employed such as by adhesive or other commonly known securing means. While it is preferred to form the main portion 6 and dam portion 8 of two separate pieces of plastic, they may be formed of a homogeneously formed single piece of plastic. As further depicted in FIG. 2, a pair of pegs 16 extend from the main portion 6 parallel to and adjacent the dam portion 8. As will be later described in more detail, the pegs 16 are provided to engage bores formed in an outer face of the wheel hub to properly position and align the grease dam during use.

Figure 3:
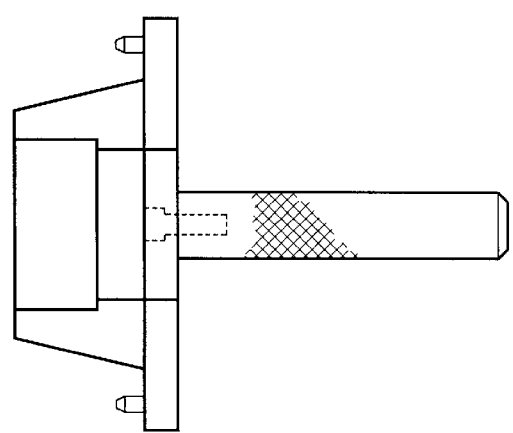
FIG. 3 is a top plan view of the grease dam tool according to an alternate embodiment of the present invention.

FIG. 3 depicts an alternative embodiment of the present invention. The recess 10a formed in the dam portion is stepped to accommodate a different spindle end arrangement.

Figure 4:
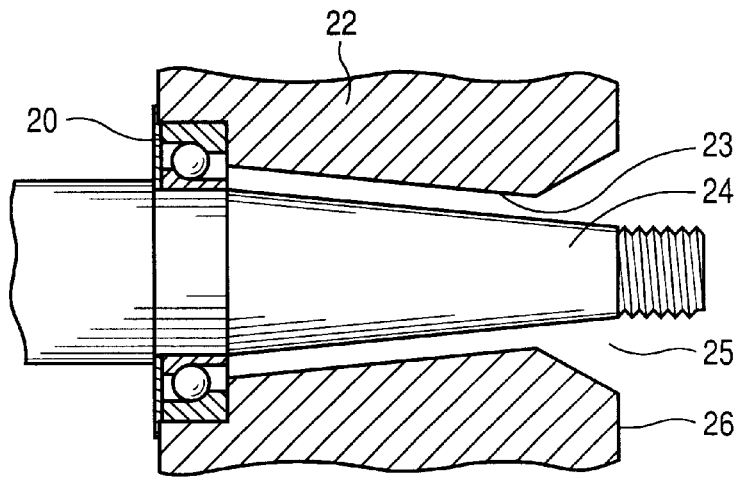
FIG. 4 is a cross section view of a partially assembled wheel hub spindle assembly.

FIG. 4 depicts a partial section view of a conventional partially assembled wheel hub/spindle assembly. An inner bearing assembly 20 is packed with grease and pre-assembled to the wheel hub 22 as is conventionally known in the art. The wheel hub 22 and inner bearing assembly 20 are mounted to the spindle 24 which has be pre-coated with grease. As can be seen, the outer end 25 of the wheel hub/spindle assembly remains open. When grease is inserted into the inner cavity 23 of the wheel hub 22, once the level reaches the inward most point of the wheel hub, the grease will simply leak out of the open end of 25 of the wheel hub/spindle assembly. Such an arrangement will not allow sufficient filling the hub cavity 23 with lubricating grease.

Figure 5:
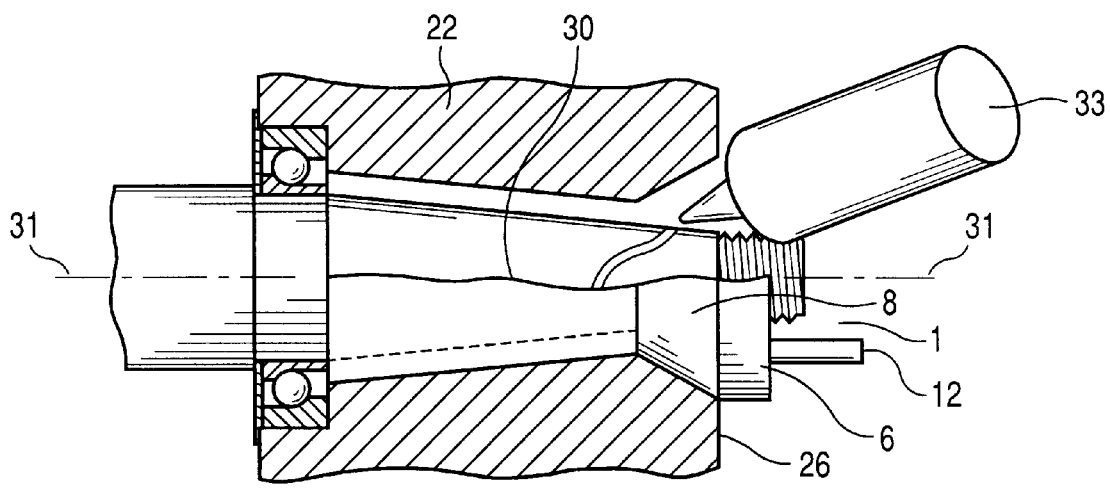
FIG. 5 is a cross sectional view of the partially assembled wheel hub/spindle assembly of FIG. 4 utilizing the grease dam tool of the present invention.

FIG. 5 depicts the same wheel hub arrangement of FIG. 4 with the application of the grease dam tool 1 of the present invention. As can be seen form FIG. 5, the grease dam tool 1 is installed on the outer end 25 of the wheel hub/spindle assembly. The main portion 6 is flush mounted to an outer face 26 of the wheel hub 22 and the dam portion 8 is inserted within the inner cavity 23 between the wheel hub 22 and the spindle 24. This arrangement blocks the lower portion of the open end 25 of the wheel hub/spindle assembly. In essence the grease dam tool simulates the presence of an outer bearing assembly and blocks the egress of grease from the inner cavity 23. A grease applicator 33 may then simply inject grease within the inner cavity 23. Because the grease dam 1 blocks the open end 25, the grease level may be filled up to the level of the grease dam tool. As previously discussed, the grease dam tool preferably circumscribes the spindle more than 180° and therefore blocks more than 50% of the exposed open end area. Consequently, a grease fill level of at least 50% is achieved. Note the grease level 30 that is located above the center line 31 of the spindle 24 and wheel hub 22. Once the inner cavity 23 has been sufficiently filled with lubricating grease (at least 50%) the grease dam 1 may be removed and a pre-packed outer bearing assembly immediately installed between the wheel hub 22 and spindle 24 adjacent the outer face 26. A securing nut may then be secured to the end of the spindle and end play of the wheel hub assembly set as conventionally known in the art.

Figure 6:
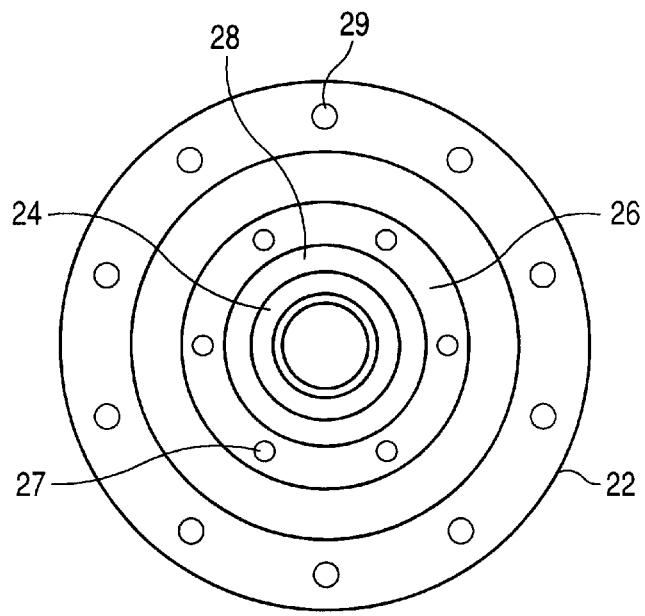
FIG. 6 is a front view of a partially assembled wheel hub/spindle assembly.
Figure 7:
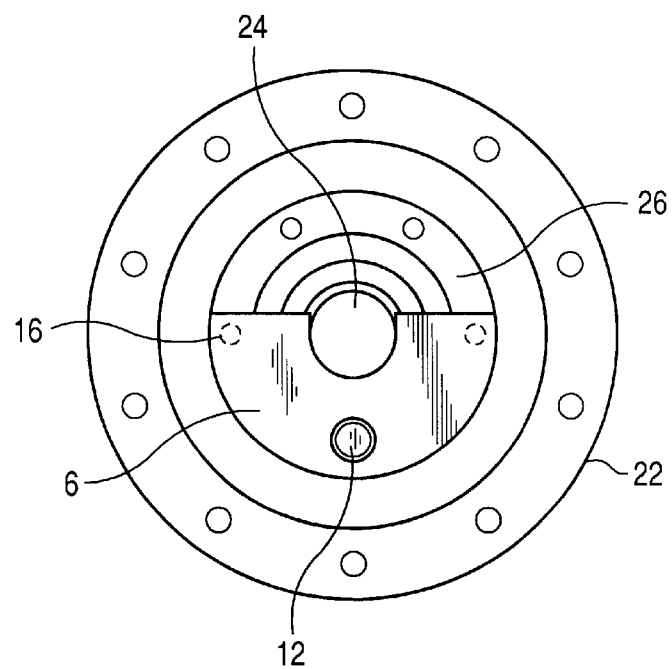
FIG. 7 is a front view of the partially assembled wheel hub/spindle assembly of FIG. 6 with a mounted grease dam of the present invention.

FIG. 6 depicts a front view of the assembly of FIG. 4. AS can bee seen there is an annular space 28 (corresponding to inner cavity 23) is disposed between the spindle 24 and the inner surface of the wheel hub 22. A plurality of lugs nuts 29 are provided on the outer periphery of the hub 22 for securing a wheel thereto. Also, provided are a plurality of bores 27 formed on-the outer race 26 which are preferably threaded to receive securing bolts from a hub cap that will seal the entire inner cavity of the wheel hub 22 once filled with grease and fully assembled with the outer bearing assembly etc. As clearly seen the lower portion of the annular space 28 remains open at the end of the wheel hub assembly. Therefore, if grease were simply injected, it would simply leak out prior to achieving a sufficient fill level. FIG. 7 shows a front view of the assembly of FIG. 6 with the application of the grease dam 1 of the present invention. As clearly shown the grease dam 1 blocks the lower portion of the open end 25 of the wheel hub/spindle assembly. The pegs 16 are inserted into corresponding bores 27 to properly position and align the grease dam tool relative to the hub 22. The engagement of the pegs 16 and bores 27 also serve to help maintain the contact with the outer face 26 of the wheel hub 22 during greasing. A user simply manipulates the handle 12 to align the pegs 16 with the corresponding bores 27 and applies pressure to maintain the main portion 6 flush against the outer face 26. As previously discussed, lubricating grease is simply then inserted in the exposed portion of the annular space 28 adjacent the top portion of the wheel hub 28. Once a proper grease fill level is achieved, the grease dam is removed and an outer bearing assembly is immediately installed and the securing nut threaded onto the spindle 24 and end play adjusted. The hub cap is then installed to seal the inner cavity 23 and ensure retainment of the grease within the inner cavity 23.

While the foregoing description of the grease dam 1 and its use has been described, the specific method of assembling and lubricating of the wheel hub/spindle assembly will now be described with appropriate reference to the drawings.

First, an outer bearing assembly is packed with lubricating grease and is preferably packed with Mobil SHC=007 synthetic grease for ready installation in the wheel hub/spindle assembly. A wheel hub 22 is provided with a pre assembled pre-packed inner bearing assembly 20 as in known in the art. Or the inner bearing assembly 20 is packed with grease, as is the outer bearing assembly, and then mounted to the wheel hub 22. The spindle 24 is then liberally coated with Mobil SHC=007 grease. The wheel hub 22 and inner bearing assembly 20 are then together installed onto the spindle 24. The grease dam tool 1 is then aligned and positioned relative to the spindle 24 and wheel hub 22 by aligning the pegs 16 with the appropriate bore 27. As can be seen in the drawing figures, the dam 8 portion is disposed between the wheel hub 22 and spindle 24, and the main portion 6. is preferably flush mounted with the outer face 26 of the wheel hub 22 so as to block the lower most portion of the open end 25 of the wheel hub/spindle assembly. Pressure is applied to the handle 12 to maintian the grease dam 1 in position. A grease applicator is the used to fill the inner cavity 23 with grease to at least 50%. The cavity being defined by the space between the inner bearing assembly 20, wheel hub 22, spindle 24 and dam portion 8 of the grease dam tool 1. Once the inner cavity 23 is filled to at least 50%, the grease dam tool 1 is removed and the outer bearing assembly is immediately installed between the wheel hub 22 and spindle 24. The securing nut is then applied and end play adjusted. An additional coating of grease is then applied to the outer surface of the outer bearing assembly and nut assembly. A hub cap is then installed to the outer face 26 of the wheel hub 22 as is known in the art taking care not to cover a vent hole in the hub cap.

While the foregoing invention has been shown and described with reference to a preferred embodiment, it will be understood by those possessing skill in the art that various changes and modifications may be made without departing from the spirit and scope of the invention. For example while a specific configuration and shapes has been shown and described for the inner surface of the wheel hub 22 and outer surface of the spindle 24 and the corresponding inner and outer bearing race seats as well as the relative positions of the recited components, the grease dam 1 of the present invention can be so dimensioned to accommodate different wheel hub 22 and spindle 24 configurations so long as the grease dam is capable of blocking the lower portion of the exposed area of the assembly while allowing injection of grease within the inner cavity 23. It is recognized that different profiles are used in the art to define the inner surface of the wheel hub 22 that defines the shape of the inner cavity 23 and the bearing race seats. Use of the present invention for different spindle profiles and end nut assemblies are also contemplated.

What is claimed is:

1. A combination wheel assembly and removable grease dam for facilitating filling grease within a cavity of said wheel assembly,
    said wheel assembly comprising;
        a wheel hub rotatably mounted onto a spindle, said spindle being disposed within said wheel hub and said cavity being defined by a space therebetween;
    said grease dam comprising;
        a main portion having a surface corresponding to and continuously engaging an outer face of said wheel hub;
        a dam portion extending from said main portion into said wheel hub and substantially disposed between said wheel hub and said spindle, said dam portion having an external surface correspondingly contoured to and engaging an inner peripheral surface of said wheel hub, said dam portion having an inner surface substantially corresponding to and engaging an external surface of said spindle; wherein said dam portion occupies at least 50% of an annular space between said wheel hub and said spindle to block egress of grease to facilitate at least a 50% fill level of grease within said cavity.

2. The combination according to claim 1, wherein said main portion and said dam portion together block a lower portion of an area between said wheel hub and said spindle adjacent an end of said wheel hub and blocking at least 50% of said area while leaving an open top portion of said area to facilitate ingress of said grease to a fill level of at least 50% of said cavity.

3. The combination wheel assembly and removable grease dam according to claim 1, further comprising a handle extending from said main portion external said wheel hub to facilitate manipulation of said grease dam by a user.

4. The combination wheel assembly and removable grease dam according to claim 1, wherein said outer face of said wheel hub has a plurality of bores and said main portion of said grease dam has at least one peg extending from said main portion and into one of said bores to facilitate relative positioning of said grease dam with respect to said wheel hub.

5. A combination wheel assembly and removable grease dam for facilitating filling grease within a cavity of said wheel assembly,
said wheel assembly comprising;
  a wheel hub rotatably mounted onto a spindle, said spindle being disposed within said wheel hub and said cavity being defined by a space there between;
said grease dam comprising;
  a main portion having a surface corresponding to and continuously engaging an outer face of said wheel hub;
  a dam portion extending from said main portion into said wheel hub and substantially disposed between said wheel hub and said spindle, said dam portion having an external surface correspondingly contoured to an inner peripheral surface of said wheel hub, said dam portion having an inner surface substantially corresponding to an external surface of said spindle; wherein said grease dam is positioned to block egress of grease to facilitate at least a 50% fill level of grease within said cavity;
wherein said main portion and said dam portion are separately formed of two pieces and secured to one another to form an integral body, said dam portion being formed as a semi-frustoconical member to engage a tapered inner surface of said wheel hub and having a longitudinally extending recess to accommodate and engage said spindle, said main portion being formed as a semi-disc shaped substantially planar member having a notch corresponding to said recess of said frustoconical member to also accommodate and engage said spindle.

6. A hand held grease dam for assisting the filling of grease within a cavity between a wheel hub and a wheel spindle, said grease dam comprising:
  a main portion formed of a substantially planar semi-disc shaped member, said main portion having a central notch, said central notch adapted and being provided to accommodate said spindle;
  a semi-frustoconically shaped dam portion orthogonally extending from a first planar side of main portion and having a recess corresponding to said notch of said main member, said recess adapted to and being provided to accommodate and engage said spindle when said dam portion is disposed between said wheel hub and said spindle;
  a handle secured to and extending from a second planar side of said main portion opposite said first planar side for manipulation of said grease dam by a user.

7. The hand held grease dam according to claim 6, said grease dam further comprising:
  a plurality of pegs extending from said first planar side of said main portion parallel to said frustoconically shaped dam portion, said plurality of pegs being provided to engage a bore formed in an outer face of said wheel hub to position said grease dam relative to said wheel hub.

8. The hand held grease dam according to claim 6, wherein said dam portion and said main portion together partially circumscribe a longitudinal line extending within said recess and said central notch more than 180° there around.

9. A combination wheel assembly and removable grease dam for filling said wheel assembly with grease,
  wheel assembly comprising;
    a wheel hub having an outer face and an inner cavity defined by an inner surface of said wheel hub;
    a spindle extending within said inner cavity and terminating proximate said outer face of said wheel hub, said inner surface of said wheel hub and said spindle defining an annular space there between;
  said removable grease dam comprising;
    a main portion substantially flush mounted to said outer face of said wheel hub and a dam portion extending from said main portion and disposed within and occupying at least 50% of said annular space, wherein said main portion and said dam portion together block at least 50% of said annular space proximate said outer face to facilitate at least a 50% grease fill level of said annular space and said inner cavity.

10. The combination wheel assembly and removable grease dam according to claim 9, wherein said main portion includes at least one peg extending therefrom and disposed within a bore formed on said outer face of said wheel hub to orient said grease dam toward a bottom portion of said wheel assembly, said grease dam circumscribing at least half of said spindle and an exposed portion of said annular space remains adjacent a top portion of said outer face of said wheel hub to allow entrance of grease into said inner cavity.

* * * * *